Oct. 8, 1968 D. M. HARVEY 3,404,612

LIGHT REGULATION MEANS FOR USE WITH MULTILAMP FLASH UNITS

Filed July 12, 1965 2 Sheets-Sheet 1

DONALD M. HARVEY
INVENTOR

BY R. Frank Smith
Thomas R. Lampe
ATTORNEYS

LIGHT REGULATION MEANS FOR USE WITH MULTILAMP FLASH UNITS

Filed July 12, 1965

DONALD M. HARVEY
INVENTOR.

BY R. Frank Smith
Thomas R. Lampe

ATTORNEYS

United States Patent Office 3,404,612

Patented Oct. 8, 1968

1

3,404,612
LIGHT REGULATION MEANS FOR USE WITH MULTILAMP FLASH UNITS

Donald M. Harvey, Rochester, N.Y., assignor to Eastman Kodak Company, Rochester, N.Y., a corporation of New Jersey Filed July 12, 1965, Ser. No. 471,011
6 Claims. (Cl. 95—11)

ABSTRACT OF THE DISCLOSURE

A camera for use with a multilamp flash attachment including a device for selectively regulating the amount of light emitted by the flash attachment in accordance with the picture-taking requirements. The device may consist of a light modifying element such as a reflector and/or an auxiliary lens disposed in operative relationship with the flash attachment to vary the intensity of the light emitted by the flash attachment. The light modifying device may be selectively moved relative to the flash attachment to provide the desired light intensity. In the alternative, the flashlamp attachment socket may be moved to provide direct or bounce illumination.

Abstract of the disclosure

This invention relates to means for varying the intensity of light falling on a subject to the photographed which is emitted from a disposable multilamp flash attachment upon actuation thereof. An attachment of this type is shown in United States Patents No. 3,327,105, Kottler et al. issued June 20, 1967.

In the conventional camera arrangement adapted for use with this type of attachment, the operator upon actuation of the camera flash mechanism energizes a single forward facing bulb. The attachment is then indexed 90° in some fashion and the succeeding bulb is then similarly positioned for firing.

Attachments of this type have built-in reflectors for each bulb and the intensity of light furnished by each bulb remains substantially constant and is adequate for most situations. Occasionally, however, a given lighting condition may call for supplemental illumination greater than that normally provided by a single flash bulb in a multilamp attachment.

Accordingly, it is an object of this invention to provide means whereby the supplemental illumination of a given scene to be photographed may be substantially varied in intensity without modifying the multilamp flash attachment per se.

The above objective has been attained by providing means whereby more than one bulb of the attachment may be fired at a given time. In addition, means is provided whereby the light path of the illumination from one or a plurality of such bulbs is modified in accordance with the conditions encountered.

Other objects of the invention will appear from the following description, reference being made to the accompanying drawings, wherein.

2

Figure 4:
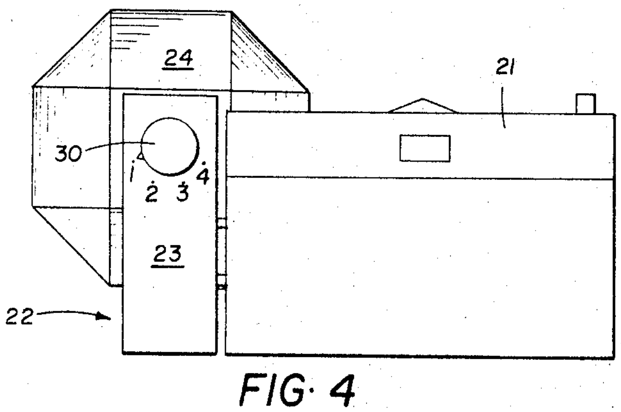
FIG. 4 is an isometric view of a flash holder and camera incorporating an alternative embodiment of the present invention.
Figure 5:
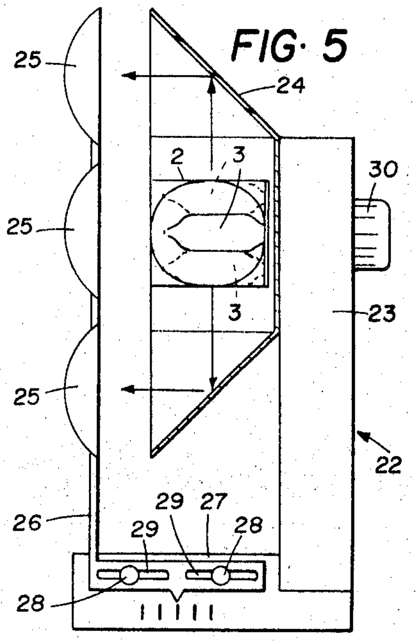
Figure 6:
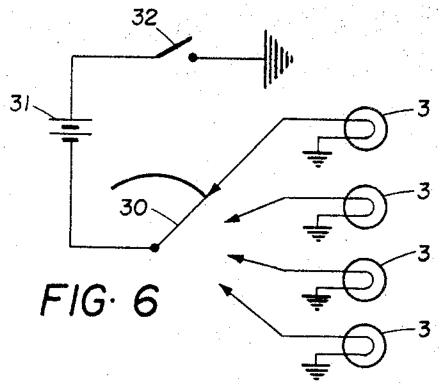
Figure 7:
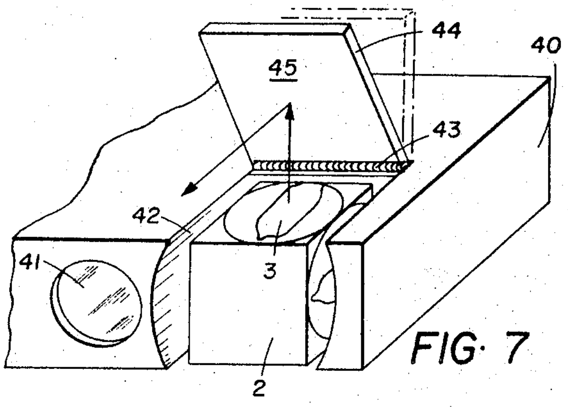
Figure 8:
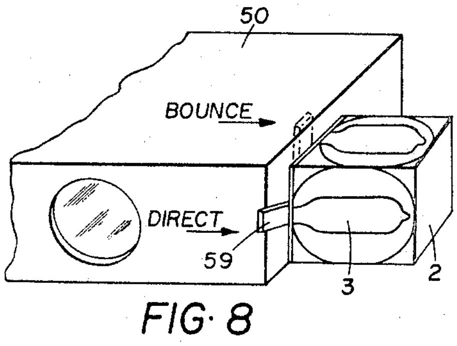
Figure 9:
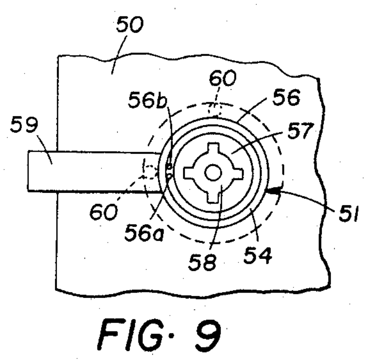
Figure 10:
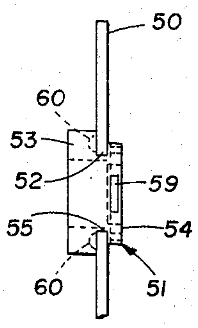

FIG. 5 is a partially broken away side view of the embodiment of the invention illustrated in FIG. 4;

FIG. 6 is a wiring diagram illustrating the circuit used with the form of the invention shown in FIG. 4;

FIGS. 7 and 8 show isometric views of cameras utilizing additional alternative embodiments of the present invention;

FIGS. 9 and 10 show specific details of the socket element utilized with the invention disclosed in FIG. 8.

Figure 1:
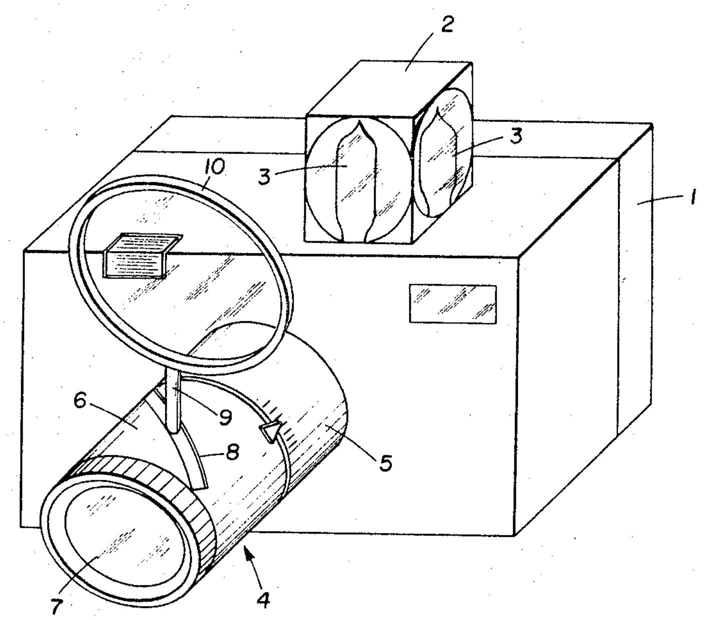
FIG. 1 is an isometric view of a camera incorporating one embodiment of the present invention.

Referring now to FIG. 1, a photographic camera 1 is shown having a multilamp flash assembly 2 of the type disclosed in the aforementioned United States Patent No. 3,327,105 disposed thereon. As may be seen, attachment 2 has a plurality of lamps 3 therein adapted to be successively presented to the front of the camera for flash purposes upon rotation of the attachment 2 through any desired expedient.

Figure 2:
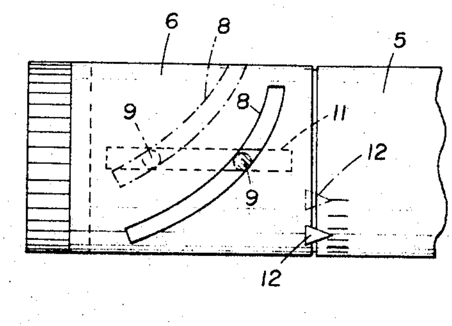
FIG. 2 is an enlarged, sectional view showing particular details of the invention shown in FIG. 1.

Camera 1 has a telephoto lens assembly 4 mounted thereon in any known manner. The lens assembly comprises a cylinder 5 fixedly mounted on the camera and an outer cylindrical segment 6 which telescopes over cylinder 5 and is mounted for rotational movement thereon. Lens 7 is focused for a given distance upon rotation of outer cylindrical segment 6 in any known manner. Segment 6 has a slot 8 therein through which protrudes a mounting member 9 which serves as a support for a lens 10. A channel 11, which is in a portion of cylinder 5 over which segment 6 is telescoped, communicates with slot 8 and also accommodates mounting member 9. As may be seen with particular reference to FIG. 2, relative displacement of cylinder 5 and segment 6 moves the mounting member 9, and hence the lens 10, in a to-and-fro motion as indicated in phantom. Mounting member 9 is mounted in channel 11 in any desired manner in such a way as to impart structural stability thereto and to keep the mounting member substantially vertical. A pointer 12 is affixed to cylindrical segment 6 for movement therewith. Suitable indicia, indicating distance of the subject, for example, are provided on cylinder 5 for cooperation with pointer 12.

Figure 3:
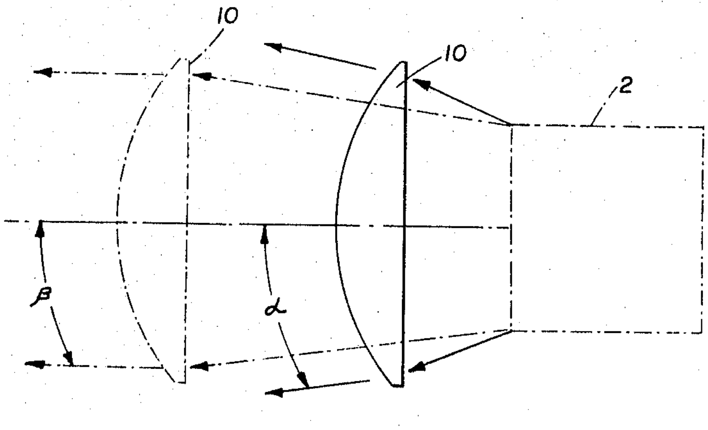
FIG. 3 is a schematic presentation illustrating optical principles utilized in the form of the invention shown in FIG. 1.

Referring now to FIG. 3, it may be seen that lens 10 is positioned in the optical path of illumination from flash attachment 2 (indicated in phantom). The lens is positioned with respect to the attachment in the manner previously described. When taking a photograph of a subject a considerable distance away, say, for example, twenty-five feet, it is necessary in some manner to intensify the illumination of a flash bulb in the subject area to render it an effective illuminant.

As may be seen, light coming from the multilamp assembly (as indicated by the arrows) strikes the lens 10 which in turn focuses the flash so that it is spread over a in solid lines, the subject is relatively close to the camera. The light emanating from the multilamp assembly is focused only to a relatively slight degree. The light passing through the perimeter portions of lens 10 is deflected to an angle $\alpha$ with respect to the central optical axis of the lens.

As the lens is moved to its dotted-line position, which corresponds to a subject a greater distance away, light is deflected at an angle $\beta$ with respect to the central optical lens axis. In this manner, the beam of light passing through lens 10 becomes more concentrated, in the nature of a spot light, and a greater amount reaches the distant subject. It may thus be seen that the concentration of a beam of light from this system is a function of subject distance, which factor is automatically compensated for upon adjustment of the camera telephoto lens.

FIGS. 4, 5 and 6 illustrate still another means for varying the intensity of light emitted from a multilamp flash attachment. A camera 21 is shown having a flash unit 22 attached thereto. Flash unit 22 comprises an upstanding handle 23 having a reflector 24 connected thereto in the customary fashion, said reflector being adapted to accommodate a multilamp flash attachment of the type described in the aforementioned United States Patent No. 3,327,105. As may be seen with particular reference to FIG. 5, the multilamp attachment 2 is positioned in reflector 24 in such a manner that light emitted from bulbs 3 bounces off the reflective surface of the reflector and is directed in a forward direction, as indicated by the arrows. A light modifying device comprising a series of lenses 25 and a mounting standard 26 are mounted for sliding movement with respect to flash unit 22 by means of a peg-and-slot arrangement. Mounting plate 27, which is rigidly connected to unit 22, has a plurality of pegs 28 which extend through associated slots 29 in mounting standard 26. In this manner the light modifying device may be positioned with respect to multilamp flash attachment 2 to vary the intensity of light over a given area. If desired, of course, a single lens may be used for such purpose of the type utilized in the above described first embodiment of the invention illustrated in FIG. 1.

Disposed on the back of handle 23 is a selector switch 30 which may be positioned by the operator in one of four positions. As may be seen with particular reference to the wiring diagram illustrated in FIG. 6, switch 30 serves to introduce any number from one to four of the bulbs 3 of the multilamp attachment into an otherwise conventional synchroflash circuit, depending upon the positioning of the switch. The remainder of the circuit comprises a battery 31 and a shutter-actuated synchronization switch 32. With this embodiment of the invention, therefore, a selected number of bulbs in the attachment may be ignited at one time by the operator and illumination therefrom may be focused over a more centralized area when a distant subject is to be photographed or a high concentration of light is required for any other purpose. Such an arrangement gives the operator a great deal of control over the illumination of the subject to be photographed.

In FIG. 7 is illustrated an additional means for varying the intensity of light directed toward a subject. A camera 40 is shown having a conventional objective lens 41 therein. A multilamp attachment 2 is positioned in a cavity 42 in the camera housing and is adapted for rotation therein. One suitable means for rotation is disclosed in United States Patent No. 3,335,651, Williams et al., issued Aug. 15, 1967. A hinge 43, positioned on the camera housing adjacent one end of cavity 42, has pivotally mounted thereon a plate 44 having any suitable reflective surface 45 thereon. When the plate 44 is positioned at a 45-degree angle to the horizontal, as indicated in solid lines, the maximum amount of light from flash bulb 3 is projected toward the front of the camera (as indicated by the arrows). When, however, the plate is raised to a vertical position (as shown in phantom), most of the light from the bulb 3 bypasses reflective surface 45. Only a fraction of the light from the bulb strikes the reflective surface and is projected toward the subject to be photographed. The hinge 43 also allows the plate 44 to be lowered over the recess 42 to form a cover therefor. In this particular embodiment, it is assumed that the relatively movable hinge elements have sufficient frictional engagement with one another to allow the plate 44 to remain in the position in which it is placed by the operator. Additional means, however, such as detents (not shown) may be additionally employed to retain the plate in position if so desired.

In FIGS. 8, 9 and 10 is illustrated still one more embodiment of the present invention. Camera 50 has a socket assembly 51 associated therewith for mounting a multilamp flash attachment 2 therein. As is apparent with reference to FIG. 10, an aperture 52 is provided in the camera housing for accommodating socket assembly 51 which comprises an inner disk 53 and an outer disk 54 integrally held together by an intermediate portion 55. The outer disk 54 comprises an outer ring 56 having two contact terminals **56*a* and 56*b* embedded therein which are connected to the camera flash synchronization circuit (not shown). Outer disk 54 further comprises an upstanding portion 57 which has irregularly shaped aperture 58 therein for accommodating a similarly shaped mounting projection (not shown) on the multilamp assembly 2**. United States Patent No. 3,353,468, Beach, issued Nov. 21, 1967, may be consulted for particular details in this regard.

Disposed on the outer periphery of outer ring 56 is an integral handle 59 which is positioned for grasping by the operator. It should be noted that handle 59 is disposed on outer ring 56 in the vicinity of terminals **56*a* and 56*b*. As may be seen with reference to the aforementioned United States Patent No. 3,353,468, terminals 56*a*, 56*b* are positioned to engage the lead-in wires of the adjacent lamp 3 of the attachment. In the present instance, the lamp 3 which is operatively connected to these terminals faces handle 59**.

The operator by manipulating handle 59 may rotate the entire socket assembly 51 and associated attachment 2. The bulb which is operatively associated with the camera synchroflash circuitry always faces in the direction of handle 59. When handle 59 faces the front of the camera, as indicated in solid lines in FIG. 8, the full illumination of bulb 3 will be directed toward the subject to be photographed. When, however, the handle is positioned as indicated in phantom, the bulb that is operatively associated with the synchroflash system is directed upwardly. The light therefrom must reach the subject by being bounced from a room ceiling, for example, thereby greatly reducing the intensity of the subject illumination. Detent means 60 may be employed to maintain the positioning of the socket assembly. At the end of a flash either manual or mechanical means may be employed to index the attachment in the socket so that a succeeding bulb is presented for flash. One mechanical means for accomplishing this is disclosed in the aforementioned United States Patent No. 3,335,651.

While this invention has been described with particular reference to preferred embodiments thereof, it is obvious that changes can be made and variations resorted to without departing from the spirit of the invention or the scope of the subjoined claims.

What is claimed is:

1. In a photographic camera having a telephoto lens operatively associated therewith, said telephoto lens having two relatively movable sections, the combination comprising:

(a) socket means mounted on said camera for detachably receiving a disposable multilamp flash attachment having a plurality of flash lamps and built-in reflectors therefor;

(b) light regulating means including a lens movably mounted on said camera and disposed in the optical path of light emitted from at least one of the lamps in a received attachment upon energization thereof for regulating said emitted light; and (c) positioning means responsive to relative movement between the two sections of said telephoto lens for selectively positioning said light regulating means with respect to said attachment.

2. The combination claimed in claim 1 wherein:

(a) said telephoto-lens sections having communicating slot means therein; and (b) said light regulating means has a portion thereof simultaneously communicating with each of said slot means;

whereby relative movement between said slot means causes positioning of said light regulating means through a camming action thereof.

3. For use with a photographic camera having a picture-taking lens and a synchroflash circuit, the combination comprising:

(a) socket means mounted on said camera for detachably receiving a disposable multilamp flash attachment having a plurality of flash lamps and built-in reflectors therefor, the axis of said socket means and received attachment being substantially parallel with the optical axis of said picture-taking lens, so that said lamps, when energized, emit light in directions generally transverse to said axes;

(b) light regulating means movably mounted on said camera and disposed in the optical path of light emitted in response to energization of at least one of the lamps in such an attachment received in said socket means for regulating said emitted light;

(c) positioning means for selectively positioning said light regulating means relative to a received attachment for regulating said emitted light in accordance with the distance of a subject to be photographed;

(d) switch means in said circuit selectively connectable with at least one of the lamps in a received attachment for simultaneously energizing the connected lamps; and (e) an auxiliary reflector disposed in spaced relationship around the periphery of said socket means and received attachment to reflect said emitted light toward said light regulating means.

4. In a photographic camera having a synchroflash circuit, the combination comprising:

(a) socket means rotatably mounted on said camera for detachably receiving a disposable multilamp flash attachment having a plurality of flash lamps and built-in reflectors therefor, said socket means having a pair of electrical contacts to connect a selected one of the lamps in a received attachment to said synchroflash circuit;

(b) selectively positionable light regulating means including handle means extending radially outward from said socket means in alignment with said contacts for manually rotating said socket means and received attachment and for indicating which lamp is connected to said circuit and in what direction said lamp is facing; and (c) means for yieldably retaining said socket means in a selected angular position;

whereby the direction of light emitted from the connected lamp upon energization thereof, and hence the flash illumination of a subject to be photographed, can be varied by manually rotating said socket means to a selected angular position.

5. For use with a photographic camera, the combination comprising:

(a) socket means for detachably receiving a disposable multilamp flash attachment having a plurality of flash lamps and built-in reflectors therefore, said socket means and received attachment defining an axis with respect to which each of said lamps, when energized, emits light in a radially outward direction;

(b) an auxiliary reflector disposed in spaced relationship around the periphery of said socket means and received attachment to reflect said emitted light in a direction generally parallel with said axis; and (c) selectively positionable light regulating means including an electrical switch for connecting a selected number of said lamps to a photoflash circuit to permit simultaneous energization of said selected number of said lamps;

whereby the number of connected lamps, and hence the emitted light reflected by said auxiliary reflector, can be varied according to the position of said light regulating means.

6. For use with a photographic camera, the combination comprising:

(a) rotatable socket means for detachably receiving a disposable multilamp flash attachment having a plurality of flash lamps and built-in reflectors therefor, said socket means having a pair of electrical contacts to connect a selected one of said lamps in a received attachment to a photoflash circuit;

(b) selectively positionable light regulating means including a handle extending radially outward from said socket means in alignment with said contacts for rotating said socket means and received attachment to a selected angular position and for indicating which one of said lamps is connected to said circuit and in what direction said one lamp is facing; and (c) means for yieldably retaining said socket means in a selected angular position;

whereby the direction of light emitted from said connected lamp upon energization thereof can be varied according to the position of said light regulating means.

References Cited

UNITED STATES PATENTS

| | | | |
|---|---|---|---|
| 2,697,390 | 12/1954 | Kindelberger | 240—1.3 XR |
| 2,810,819 | 10/1957 | Gibson | 240—1.3 |
| 2,811,907 | 11/1957 | Hyzer | 95—11.5 |
| 3,111,274 | 11/1963 | Turano | 95—11.5XR |
| 3,167,256 | 1/1965 | Elliott | 240—1.3 |
| 3,286,611 | 11/1966 | Lange | 240—1.3 XR |
| 3,319,547 | 5/1967 | Parsons et al. | 240—1.3 XR |
| 3,296,947 | 1/1967 | Engelsmann et al. | 95—1 |

NORTON ANSHER, *Primary Examiner.*

FRED L. BRAUN, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,404,612 October 8, 1968

Donald M. Harvey

It is certified that error appears in the above identified patent and that said Letters Patent are hereby corrected as shown below:

Column 1, line 28, cancel "Abstract of the disclosure"; line 30, "the" should read -- be --. Column 2, line 54, before "in" insert -- smaller area. When the lens is in the position indicated --. Column 5, line 52, "therefore" should read -- therefor --.

Signed and sealed this 24th day of February 1970.

(SEAL)

Attest:

Edward M. Fletcher, Jr.

Attesting Officer

WILLIAM E. SCHUYLER, JR.

Commissioner of Patents